US008059897B2

(12) United States Patent
Xu et al.

(10) Patent No.: US 8,059,897 B2
(45) Date of Patent: Nov. 15, 2011

(54) METHOD FOR AUTOMATICALLY PERFORMING AN IMAGE PROCESSING FUNCTION ON AN ELECTRONIC DEVICE

(75) Inventors: Xiang Xu, Nanjing (CN); Qi Xiang Li, Nanjing (CN); Zhao Hui Li, Nanjing (CN); Ke Jiao Zhang, Nanjing (CN)

(73) Assignee: Motorola Mobility, Inc., Libertyville, IL (US)

( * ) Notice: Subject to any disclaimer, the term of this patent is extended or adjusted under 35 U.S.C. 154(b) by 870 days.

(21) Appl. No.: 11/953,308

(22) Filed: Dec. 10, 2007

(65) Prior Publication Data

US 2009/0148074 A1 Jun. 11, 2009

(51) Int. Cl.
*G06K 9/00* (2006.01)
(52) U.S. Cl. ........................................ 382/181; 345/581
(58) Field of Classification Search .................. 382/100, 382/181, 195, 305, 306, 312, 313; 345/581–618; 705/1.1–45; 715/856–862
See application file for complete search history.

(56) References Cited

U.S. PATENT DOCUMENTS

| 7,030,890 | B1 * | 4/2006 | Jouet et al. ................... 345/619 |
| 7,098,923 | B2 * | 8/2006 | Kumada et al. ............... 345/581 |
| 7,156,311 | B2 | 1/2007 | Attia et al. |
| 2002/0054172 | A1 * | 5/2002 | Berman et al. ................ 345/856 |
| 2002/0156866 | A1 | 10/2002 | Schneider |
| 2005/0055281 | A1 | 3/2005 | Williams |
| 2005/0057669 | A1 | 3/2005 | Wakefield |
| 2005/0212830 | A1 | 9/2005 | Silverbrook et al. |
| 2006/0025175 | A1 | 2/2006 | Lapstun et al. |
| 2006/0242189 | A1 | 10/2006 | Leetaru et al. |
| 2007/0067825 | A1 | 3/2007 | Lapstun et al. |
| 2007/0101285 | A1 | 5/2007 | Mohr |
| 2007/0104452 | A1 | 5/2007 | Wang et al. |
| 2007/0162350 | A1 | 7/2007 | Friedman |
| 2007/0182976 | A1 | 8/2007 | Silverbrook |
| 2009/0303204 | A1 * | 12/2009 | Nasiri et al. .................. 345/184 |
| 2010/0299630 | A1 * | 11/2010 | McCutchen et al. .......... 715/803 |
| 2011/0010241 | A1 * | 1/2011 | Mays .......................... 705/14.49 |

OTHER PUBLICATIONS http://www.barcodemobile.com.
US 7,264,158, 09/2007, Williams (withdrawn)

* cited by examiner

*Primary Examiner* — Anand Bhatnagar

(57) ABSTRACT

A method (400) for automatically performing a plurality of image processing functions on an electronic device (100) by providing a plurality of image processing option keys (405) including a first image processing option key and a second image processing option key. The first image processing option key is associated with a first image processing function and the second image processing option key is associated with a second image processing function that is different from the first image processing function. The method (400) performs capturing (410) a first image using a camera (119) in response to a user activation of the first image processing option key and then automatically performing (415) the first image processing function in response to capturing the first image. Next, there is performed a capturing (420) a second image using the camera (119) in response to a user activation of the second image processing option key and automatically performing (425) the second image processing function in response to capturing the second image. Both the first image processing function and the second image processing function are selected from a group of functions.

20 Claims, 3 Drawing Sheets

METHOD FOR AUTOMATICALLY PERFORMING AN IMAGE PROCESSING FUNCTION ON AN ELECTRONIC DEVICE

FIELD OF THE INVENTION

The present invention relates generally to wireless communication devices, and in particular to multi-function wireless communication devices that include a camera.

BACKGROUND

Users continually seek increased functionality from portable electronic devices. Further, it is often desirable to integrate the capabilities and functionality of different portable devices into a single portable device, so as to eliminate the need to carry multiple devices. From a user's perspective, eliminating the need to carry multiple devices provides a significant advantage because carrying multiple devices can be cumbersome. Additional advantages that can be realized by integrating the capabilities of multiple devices into a single device include reducing costs by eliminating the need to purchase multiple devices, as well as eliminating the need to purchase and maintain separate batteries and accessories for multiple devices.

Mobile telephones are increasingly multi-function devices that can include, in addition to wireless telephony services, functions and applications commonly associated with cameras, digital music players, personal digital assistants, notebook computers, and various other devices. For example, mobile telephones often include applications for photography, image processing, media playing, calendaring, personal information management, internet browsing, and processing emails. However, increased functionality often results in more complex devices that are more difficult to operate. For example, some multi-function devices require navigating complex menus or pressing multiple keypad entries to activate specific functions.

BRIEF DESCRIPTION OF THE DRAWINGS

In order that the invention may be readily understood and put into practical effect, reference will now be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
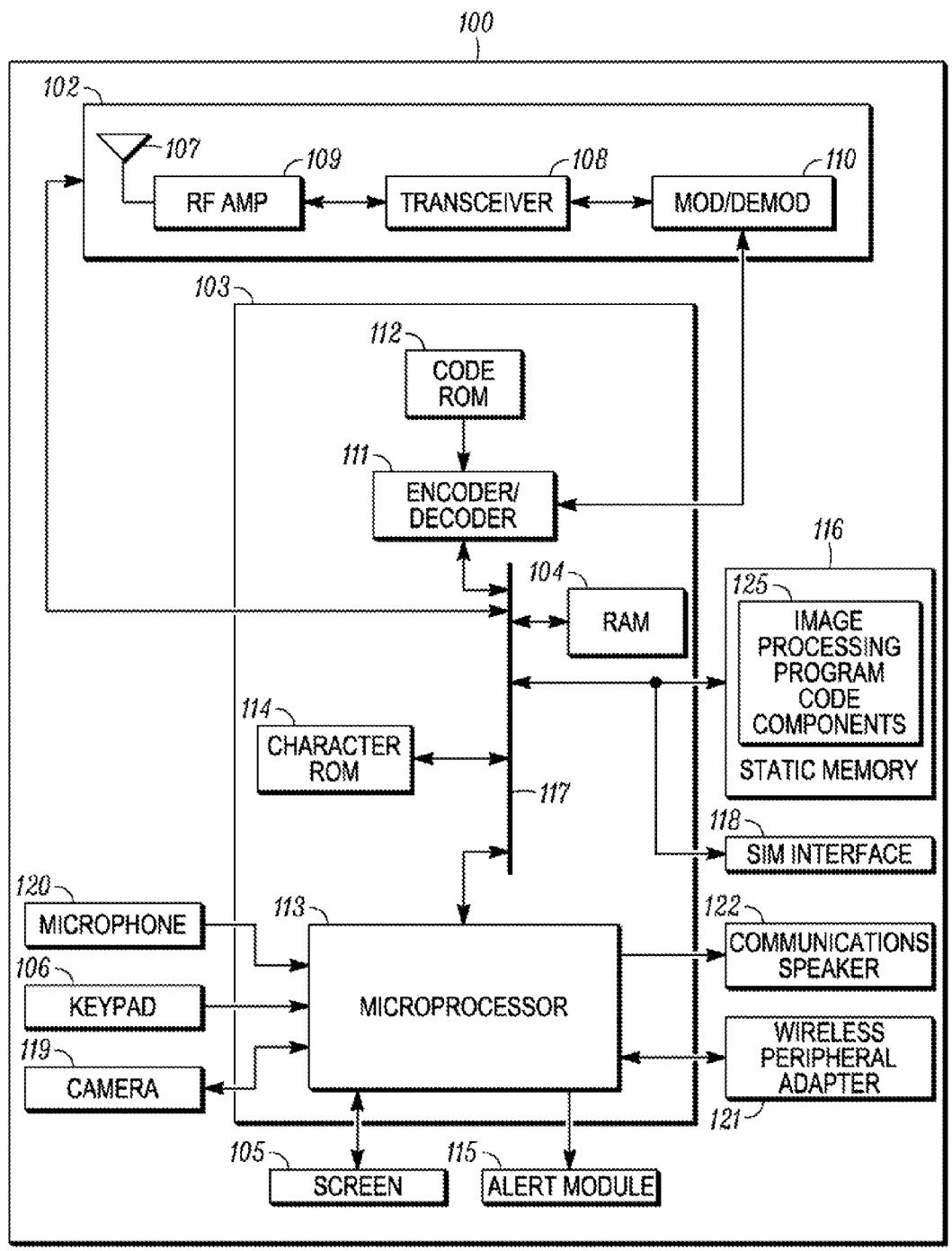
FIG. 1 is a schematic diagram illustrating a multi-function wireless communication device in the form of a mobile telephone, according to some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and device for automatically performing an image processing function. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIG. 1, a schematic diagram illustrates a multi-function wireless communication device in the form of a mobile telephone 100, according to some embodiments of the present invention. The mobile telephone 100 comprises a radio frequency communications unit 102 coupled to be in communication with a common data and address bus 117 of a processor 103. The mobile telephone 100 also has a keypad 106, a display screen 105, such as a touch screen, coupled to be in communication with the processor 103.

The processor 103 also includes an encoder/decoder 111 with an associated code Read Only Memory (ROM) 112 for storing data for encoding and decoding voice or other signals that may be transmitted or received by the mobile telephone 100. The processor 103 further includes a microprocessor 113 coupled, by the common data and address bus 117, to the encoder/decoder 111, a character Read Only Memory (ROM) 114, a Random Access Memory (RAM) 104, programmable memory 116 and a Subscriber Identity Module (SIM) interface 118. The programmable memory 116 and a SIM operatively coupled to the SIM interface 118 each can store, among other things, selected text messages and a Telephone Number Database (TND) comprising a number field for telephone numbers and a name field for identifiers associated with one of the numbers in the name field.

The radio frequency communications unit 102 is a combined receiver and transmitter having a common antenna 107. The communications unit 102 has a transceiver 108 coupled to the antenna 107 via a radio frequency amplifier 109. The transceiver 108 is also coupled to a combined modulator/demodulator 110 that is coupled to the encoder/decoder 111.

The microprocessor 113 has ports for coupling to the keypad 106, to the display screen 105, and to a camera 119. The microprocessor 113 further has ports for coupling to an alert module 115 that typically contains an alert speaker, vibrator motor and associated drivers, to a wireless peripheral adapter 121 such as a Bluetooth® adapter, to a microphone 120 and to a communications speaker 122. The character ROM 114 stores code for decoding or encoding data such as text messages that may be received by the communications unit 102. In some embodiments of the present invention, the character ROM 114, the programmable memory 116, or a SIM also can store operating code (OC) for the microprocessor 113 and code for performing functions associated with the mobile telephone 100. For example, the programmable memory 116 can comprise computer readable program code components 125 configured to cause execution of a method for performing an image processing function on the mobile telephone 100, according to an embodiment of the present invention.

According to one aspect, the present invention includes a method for automatically performing an image processing function on an electronic device, such as the mobile telephone 100. The method includes providing on the electronic device a plurality of image processing option keys. An image processing function is then performed automatically on an image that was captured using a camera of the electronic device, in response to a user activation of one key in the plurality of image processing option keys. Each key in the plurality of image processing option keys is associated with only one function selected from the following functions, and no two of the keys are associated with a same function selected from the following functions: dialing a phone number associated with a captured image; displaying a map of an area identified by an address captured in an image; displaying a route plan to an address captured in an image; storing an image and then subsequently providing a reminder to review the image; playing a multimedia file associated with a feature in a captured image; displaying search results based on a search of data captured in an image; storing in an electronic contacts database data captured in an image; transmitting a captured image; and a user defined image processing function.

Thus, according to some embodiments of the present invention, a user of an electronic device is presented with a plurality of image processing options, each of which can be activated using a single key. The keys are presented to the user simultaneously with a viewfinder feature of a camera of the device. So a user of the electronic device can simply point the camera at a particular object or scene, and then press a single key associated with a desired image processing option. The device then automatically captures an image using the camera and performs a desired image processing function.

According to the prior art, facilitating easy and simple to use features on multifunction electronic devices is often difficult. With a high number of available functions, device users are often required to navigate numerous menu screens or perform a tedious series of key presses to execute a desired function. That is often particularly evident with camera features, where available image processing features generally require selection of an existing image, before selection of a particular processing feature is enabled.

Some embodiments of the present invention therefore include providing a plurality of quick access soft keys on the display screen 105 of the mobile telephone 100 after a camera feature has been activated. For example, a user of the mobile telephone 100 may activate the camera 119 using a camera key displayed on a main menu of the display screen 105. As known by those having ordinary skill in the art, a lens of the camera 119 then becomes active and the display screen 105 functions as a camera viewfinder, displaying a transient image of any scene or object that is in front of the lens of the camera 119. The image processing option keys of the present invention are then provided as the plurality of quick access soft keys on the display screen 105. For example, the quick access soft keys can be presented as an overlay on the viewfinder image, or as translucent "water mark" images on the viewfinder image. Alternatively, the image processing option keys can be provided as hard keys on the keypad 106.

Figure 2:
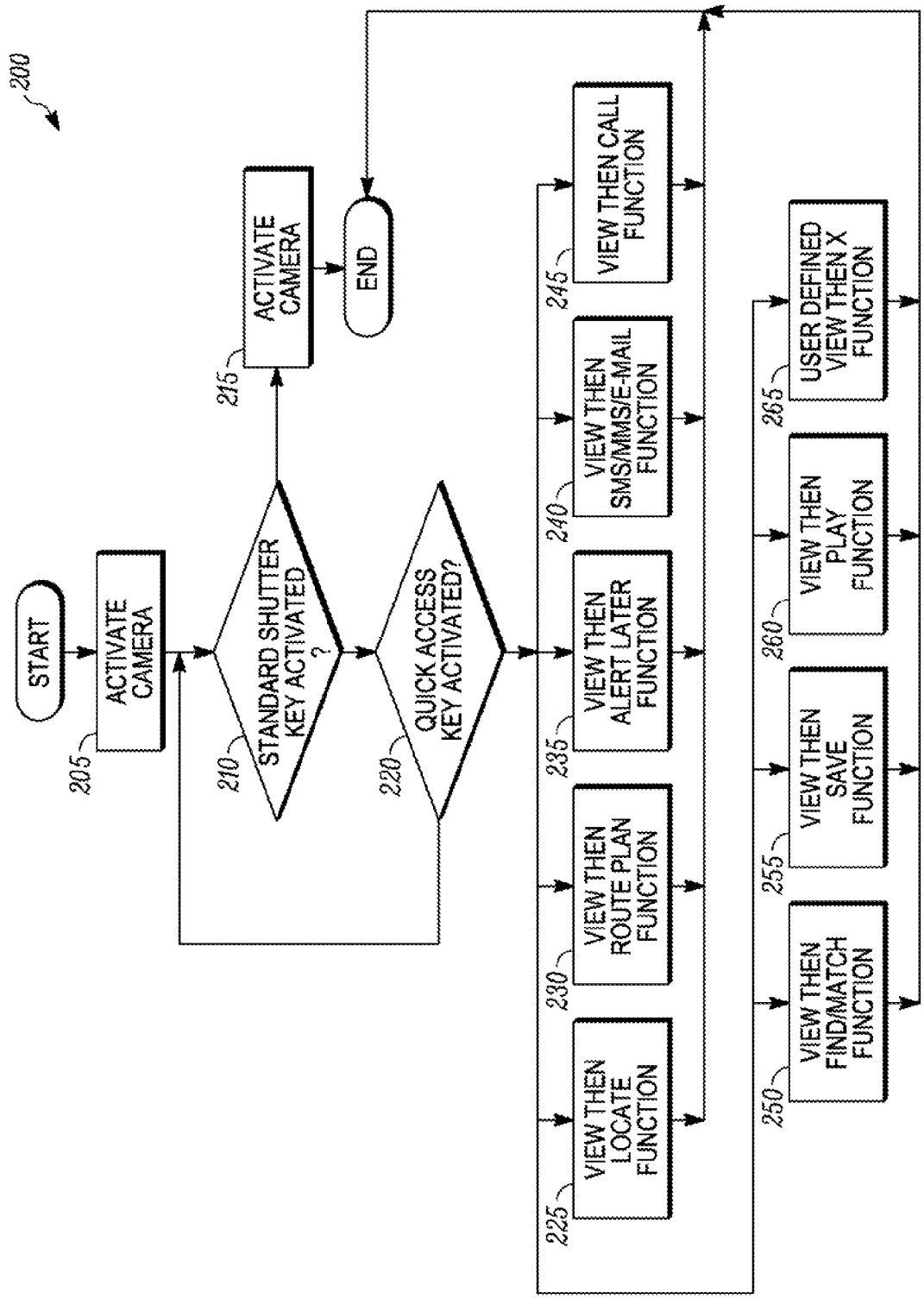
FIG. 2 is a general flow diagram illustrating a method for automatically performing an image processing function on a mobile telephone, according to some embodiments of the present invention.

Referring to FIG. 2, a general flow diagram illustrates a method 200 for automatically performing an image processing function on the mobile telephone 100, according to some embodiments of the present invention. At step 205, the camera 119 of the mobile telephone 100 is activated, such as by using the keypad 106 or a soft key on the display screen 105. A transient image received through a lens of the camera 119 is thus displayed as a viewfinder image on the display screen 105. Next, at step 210, it is determined whether a user has taken a picture using a standard camera shutter key. If so, then at step 215 a conventional picture procedure is executed, whereby the mobile telephone 100 captures an image and stores the image to a memory such as the programmable memory 116. If the standard camera shutter key has not been depressed, then at step 220 it is determined whether an image processing option key such as a quick access soft key has been pressed. If not, the method 200 cycles back to step 210.

However, if a quick access soft key has been pressed, then a specific image processing function is initiated on the mobile telephone 100. For example, a quick access soft key may be associated with one of the following functions:

Step 225 corresponds with a "view then locate" function that is performed in response to pressing a "view then locate" key. For example, such a "view then locate" function may cause displaying a map of an area identified by an address captured in an image. If a user of the mobile telephone 100 points the lens of the camera 119 at an object that includes an address and then presses the "view then locate" key at step 225, the mobile telephone 100 will use optical character recognition software to identify the address, download to the electronic device a map of the area identified by the address, and then display the map on the display screen 105 of the mobile telephone 100.

Step 230 corresponds with a "view then route plan" function that is performed in response to pressing a "view then route plan" key. For example, such a "view then route plan" function may cause displaying a route plan to an address captured in an image. If a user of the mobile telephone 100 points the lens of the camera 119 at an object that includes an address and then presses the "view then route plan" key at step 230, the mobile telephone 100 will use optical character recognition software to identify the address, determine a current location of the mobile telephone 100 (for example, using a Global Positioning System (GPS) module, or other location function), download the route plan to the mobile telephone 100, and then display the route plan on the display screen 105.

Step 235 corresponds with a "view then alert later" function that is performed in response to pressing a "view then alert later" key. For example, such a "view then alert later" function may cause storing an image and then subsequently providing a reminder to review the image. If a user of the mobile telephone 100 points the lens of the camera 119 at a scene or object and then presses the "view then alert later" key at step 235, the mobile telephone 100 will capture an image of the scene or object, store the image in a memory such as the programmable memory 116, and then schedule a reminder, such as an audible or visual reminder, to be provided to the user after a predetermined time period.

Step 240 corresponds with a "view then SMS/MMS/E-mail" function that is performed in response to pressing a "view then SMS/MMS/E-mail" key, where SMS refers to a short messaging service and MMS refers to multimedia messaging service. For example, such a "view then SMS/MMS/E-mail" function may cause emailing a captured image to a designated recipient. If a user of the mobile telephone 100 points the lens of the camera 119 at a scene or object and then presses the "view then SMS/MMS/E-mail" key at step 240, the mobile telephone 100 will automatically email a captured image to an email address selected by the user from an email address list. Alternatively, a user can program this function to send SMS, MMS, instant messaging (IM), or other types of messages instead of emails.

Step 245 corresponds with a "view then call" function that is performed in response to pressing a "view then call" key. For example, such a "view then call" function may cause dialing a phone number associated with a captured image. If a user of the mobile telephone 100 points the lens of the camera 119 at an object that includes a contact's name or a phone number and then presses the "view then call" key at step 245, the mobile telephone 100 will use optical character recognition software to identify the contact's name or the phone number, and then dial the phone number associated with the contact using a phone feature of the mobile telephone 100. Alternatively, using image matching software, the mobile telephone 100 can associate the phone number with the captured image. For example, the image may include an image of a person, which image matches an image of a person stored in a contact database of the mobile telephone 100. Image matching software, which software is known by those having ordinary skill in the art, then can be used to match the two images.

Step 250 corresponds with a "view then find/match" function that is performed in response to pressing a "view then find/match" key. For example, such a "view then find/match" function may provide search results based on a search of data captured in an image. If a user of the mobile telephone 100 points the lens of the camera 119 at an object and then presses the "view then find/match" key at step 250, the mobile telephone 100 will use optical character recognition software to identify text in the image, perform a local search, or search an online database, download the search results to the mobile telephone 100, and then display the search results on the display screen 105 of the mobile telephone 100.

Step 255 corresponds with a "view then save" function that is performed in response to pressing a "view then save" key. For example, such a "view then save" function may cause automatic capture and storage of an image. If a user of the mobile telephone 100 points the lens of the camera 119 at a scene or object and then presses the "view then save" key at step 255, the mobile telephone 100 will automatically capture an image of the scene or object and save it to a predetermined memory location. For example, using optical character recognition software, the mobile telephone 100 can identify contact data in an image and then store the contact data in an electronic contacts database.

Step 260 corresponds with a "view then play" function that is performed in response to pressing a "view then play" key. For example, such a "view then play" function may cause playing of a multimedia file associated with a feature in a captured image. If a user of the mobile telephone 100 points the lens of the camera 119 at a text document that includes a name of a song or music band and then presses the "view then play" key at step 260, the mobile telephone 100 will use optical character recognition software to identify the song or music band, search multimedia files stored in the programmable memory 116 or in an online database, and begin playing a selection from one of those files that includes metadata that matches the name of the song or music band.

Finally, step 265 corresponds with a user defined "view then X" function that is performed in response to pressing a "view then X" key. Such a key can be pre-programmed by a user of the mobile telephone 100. For example, such a user defined image processing function can comprise reading a bar code captured in an image and displaying information associated with the bar code on the display screen 105.

As is known by those having ordinary skill in the art, image analysis software and optical character recognition software necessary to perform many of the above described functions is readily available and can be implemented without undue experimentation to perform the above described functions on an electronic device such as the mobile telephone 100.

Figure 3:
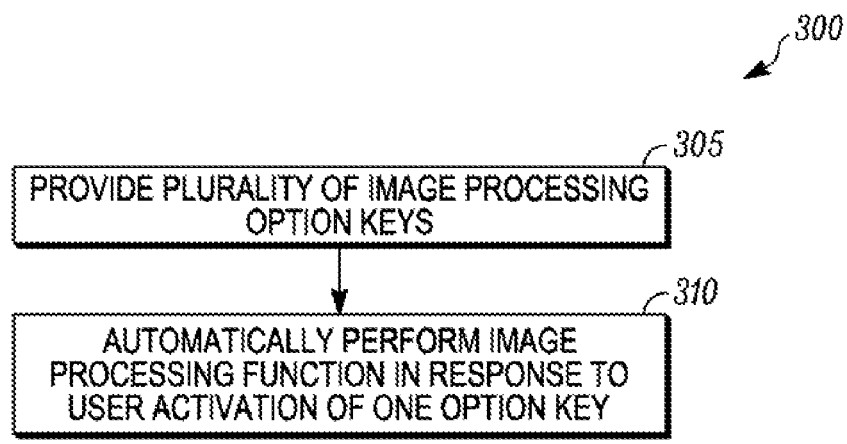
FIG. 3 is a general flow diagram illustrating a method for automatically performing an image processing function on an electronic device, such as a mobile telephone, according to some embodiments of the present invention.

Referring to FIG. 3, a general flow diagram illustrates a method 300 for automatically performing an image processing function on an electronic device, such as the mobile telephone 100, according to some embodiments of the present invention. At step 305, a plurality of image processing option keys are provided on the electronic device. For example, the keys can be provided as soft keys on a display screen of the electronic device or as physical keys on a keypad of the electronic device. Next, at step 310, an image processing function is automatically performed on an image that was captured using a camera of the electronic device, in response to a user activation of one key in the plurality of image processing option keys. Each key in the plurality of image processing option keys is associated with only one function selected from the following functions, and no two of the keys are associated with a same function selected from the following functions: dialing a phone number associated with a captured image; displaying a map of an area identified by an address captured in an image; displaying a route plan to an address captured in an image; storing an image and then subsequently providing a reminder to review the image; playing a multimedia file associated with a feature in a captured image; displaying search results based on a search of data captured in an image; storing in an electronic contacts database data captured in an image; transmitting a captured image; and a user defined image processing function.

Figure 4:
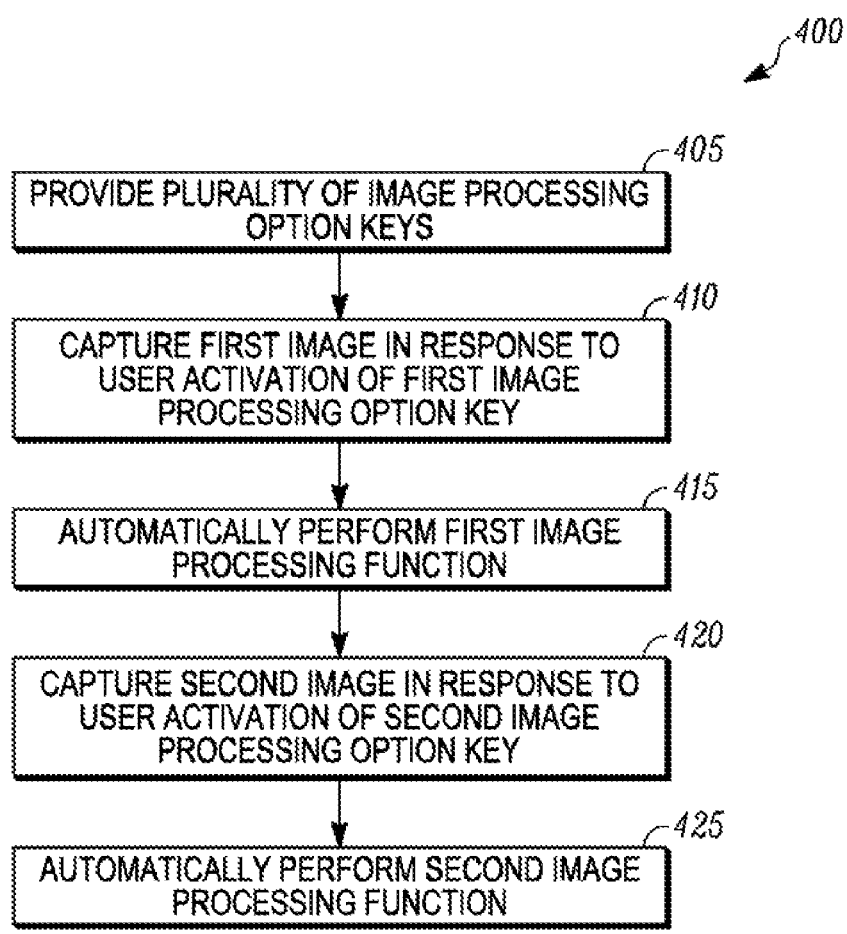
FIG. 4 is a general flow diagram illustrating a method for automatically performing a plurality of image processing functions on an electronic device, such as a mobile telephone, according to some embodiments of the present invention.

Referring to FIG. 4, a general flow diagram illustrates a method 400 for automatically performing a plurality of image processing functions on an electronic device, such as the mobile telephone 100, according to some embodiments of the present invention. At step 405, a plurality of image processing option keys, including a first image processing option key and a second image processing option key, are provided on the electronic device. The first image processing option key is associated with a first image processing function and the second image processing option key is associated with a second image processing function that is different from the first image processing function. For example, a first quick access key associated with the "view then locate" function of step 225 of the method 200, and a second quick access key associated with the "view then call" function of step 245 of the method 200 are provided simultaneously as soft keys on the display screen 105 of the mobile telephone 100.

At step 410, a first image is captured using a camera of the electronic device in response to a user activation of the first image processing option key. For example, the camera 119 captures a first image of a text document including an address in response to user activation of the "view then locate" key.

At step 415, the first image processing function is then automatically performed in response to capturing the first image. For example, the "view then locate" function of step 225 described above is automatically performed.

At step 420, a second image is captured using the camera of the electronic device in response to a user activation of the second image processing option key. For example, the camera 119 captures a second image of a text document including a phone number in response to user activation of the "view then call" key.

At step 425, the second image processing function is then automatically performed in response to capturing the second image. For example, the "view then call" function of step 245 described above is automatically performed.

In the method 400, both the first image processing function and the second image processing function are selected from the following functions: dialing a phone number associated with a captured image; displaying a map of an area identified by an address captured in an image; displaying a route plan to an address captured in an image; storing an image and then subsequently providing a reminder to review the image; playing a multimedia file associated with a feature in a captured image; displaying search results based on a search of data captured in an image; storing in an electronic contacts database data captured in an image; transmitting a captured image; and a user defined image processing function.

Embodiments of the present invention therefore enable various complex functions to be executed easily and intuitively by a user of an electronic device. Image processing and optical character recognition functions, which are known by those having ordinary skill in the art, can be harnessed and utilized based on a single key entry on an electronic device such as the mobile telephone 100.

It will be appreciated that embodiments of the invention described herein may be comprised of one or more conventional processors and unique stored program instructions that control the one or more processors to implement, in conjunction with certain non-processor circuits, some, most, or all of the functions of automatically performing an image processing function on an electronic device as described herein. The non-processor circuits may include, but are not limited to, a radio receiver, a radio transmitter, signal drivers, clock circuits, power source circuits, and user input devices. As such, these functions may be interpreted as steps of a method for automatically performing an image processing function on an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

We claim:

1. A method for automatically performing an image processing function on an electronic device, the method comprising:
   providing on the electronic device a plurality of image processing option keys; and
   automatically performing an image processing function on an image that was captured using a camera of the electronic device, in response to a user activation of one key in the plurality of image processing option keys;
   wherein each key in the plurality of image processing option keys is associated with only one function selected from the following functions, and no two of the keys are associated with a same function selected from the following functions: dialing a phone number associated with a captured image; displaying a map of an area identified by an address captured in an image; displaying a route plan to an address captured in an image; storing an image and then subsequently providing a reminder to review the image; playing a multimedia file associated with a feature in a captured image; displaying search results based on a search of data captured in an image; storing in an electronic contacts database data captured in an image; transmitting a captured image; and a user defined image processing function.

2. The method of claim 1, wherein the function of dialing a phone number associated with a captured image comprises using optical character recognition software to identify the phone number, or using image matching software to associate the phone number with the captured image, then dialing the phone number using a phone feature of the electronic device.

3. The method of claim 1, wherein the function of displaying a map of an area identified by an address captured in an image comprises using optical character recognition software to identify the address, downloading to the electronic device a map of the area identified by the address, and then displaying the map on a display screen of the electronic device.

4. The method of claim 1, wherein the function of displaying a route plan to an address captured in an image comprises using optical character recognition software to identify the address, identifying a current location, downloading the route plan to the electronic device, and then displaying the map on a display screen of the electronic device.

5. The method of claim 1, wherein the function of displaying search results based on a search of data captured in an image comprises using optical character recognition software to identify the data, using the data to search an online database, downloading the search results to the electronic device, and then displaying the search results on a display screen of the electronic device.

6. The method of claim 1, wherein the function of storing in an electronic contacts database data captured in an image comprises using optical character recognition software to identify the contact data and then storing the contact data in a memory of the electronic device.

7. The method of claim 1, wherein the function of transmitting a captured image comprises displaying an email address list to a user and emailing the captured image to an email address selected by the user from the email address list.

8. The method of claim 1, wherein the user defined image processing function comprises reading a bar code captured in the image and displaying information associated with the bar code.

9. The method of claim 1, wherein the plurality of image processing option keys are provided as soft keys on a display screen of the electronic device.

10. The method of claim 1, wherein the plurality of image processing option keys are provided on a keypad of the electronic device.

11. The method of claim 1, wherein the electronic device comprises a mobile telephone.

12. A method for automatically performing a plurality of image processing functions on an electronic device, the method comprising:
  providing on the electronic device a plurality of image processing option keys, including a first image processing option key and a second image processing option key, wherein the first image processing option key is associated with a first image processing function and the second image processing option key is associated with a second image processing function that is different from the first image processing function;
  capturing a first image using a camera of the electronic device in response to a user activation of the first image processing option key;
  automatically performing the first image processing function in response to capturing the first image;
  capturing a second image using the camera of the electronic device in response to a user activation of the second image processing option key; and
  automatically performing the second image processing function in response to capturing the second image;
  wherein both the first image processing function and the second image processing function are selected from the following functions: dialing a phone number associated with a captured image; displaying a map of an area identified by an address captured in an image; displaying a route plan to an address captured in an image; storing an image and then subsequently providing a reminder to review the image; playing a multimedia file associated with a feature in a captured image; displaying search results based on a search of data captured in an image; storing in an electronic contacts database data captured in an image; transmitting a captured image; and a user defined image processing function.

13. An electronic device, comprising:
  computer readable program code components for providing on the electronic device a plurality of image processing option keys, including a first image processing option key and a second image processing option key, wherein the first image processing option key is associated with a first image processing function and the second image processing option key is associated with a second image processing function that is different from the first image processing function;
  computer readable program code components for capturing a first image using a camera of the electronic device in response to a user activation of the first image processing option key;
  computer readable program code components for automatically performing the first image processing function in response to capturing the first image;
  computer readable program code components for capturing a second image using the camera of the electronic device in response to a user activation of the second image processing option key; and
  computer readable program code components for automatically performing the second image processing function in response to capturing the second image;
  wherein both the first image processing function and the second image processing function are selected from the following functions: dialing a phone number associated with a captured image; displaying a map of an area identified by an address captured in an image; displaying a route plan to an address captured in an image; storing an image and then subsequently providing a reminder to review the image; playing a multimedia file associated with a feature in a captured image; displaying search results based on a search of data captured in an image; storing in an electronic contacts database data captured in an image; transmitting a captured image; and a user defined image processing function.

14. The device of claim 13, wherein the function of dialing a phone number associated with a captured image comprises using optical character recognition software to identify the phone number and then dialing the phone number using a phone feature of the electronic device.

15. The device of claim 13, wherein the function of displaying a map of an area identified by an address captured in an image comprises using optical character recognition software to identify the address, downloading to the electronic device a map of the area identified by the address, and then displaying the map on a display screen of the electronic device.

16. The device of claim 13, wherein the function of displaying a route plan to an address captured in an image comprises using optical character recognition software to identify the address, identifying a current location, downloading the route plan to the electronic device, and then displaying the map on a display screen of the electronic device.

17. The device of claim 13, wherein the function of displaying search results based on a search of data captured in an image comprises using optical character recognition software to identify the data, using the data to search an online database, downloading the search results to the electronic device, and then displaying the search results on a display screen of the electronic device.

18. The device of claim 13, wherein the function of storing in an electronic contacts database data captured in an image comprises using optical character recognition software to identify the contact data and then storing the contact data in a memory of the electronic device.

19. The device of claim 13, wherein the function of transmitting a captured image comprises displaying an email address list to a user and emailing the captured image to an email address selected by the user from the email address list.

20. The device of claim 13, wherein the user defined image processing function comprises reading a bar code captured in the image and displaying information associated with the bar code.

* * * * *